United States Patent
Jahns et al.

[11] Patent Number: 5,977,201
[45] Date of Patent: Nov. 2, 1999

[54] CROSSLINKED POLYMER SYSTEMS HAVING REVERSIBLE TEMPERATURE-DEPENDENT RADIATION TRANSMISSION

[75] Inventors: Ekkehard Jahns, Weinheim; Hubertus Kröner, Neustadt; Wolfgang Schrof, Neuleiningen; Utz Klodwig, Mannheim, all of Germany

[73] Assignee: BASF Aktiengesellschaft, Ludwigshafen, Germany

[21] Appl. No.: 09/003,353

[22] Filed: Jan. 6, 1998

Related U.S. Application Data

[63] Continuation of application No. 08/702,559, filed as application No. PCT/EP95/00692, Feb. 25, 1995, abandoned.

[30] Foreign Application Priority Data

Mar. 11, 1994 [DE] Germany ............................ 44 08 156

[51] Int. Cl.$^6$ ............................... C08F 2/46; G02F 1/00; C08L 33/04
[52] U.S. Cl. ............................. 522/111; 522/112; 522/35; 525/55; 525/185; 525/186; 525/227; 525/241; 525/931; 525/932; 252/582; 252/589; 252/583
[58] Field of Search ....................... 522/110, 111, 522/112, 35; 525/55, 185, 186, 227, 241, 931, 932; 252/582, 589, 583

[56] References Cited

U.S. PATENT DOCUMENTS

| | | | |
|---|---|---|---|
| 4,559,117 | 12/1985 | Bohm ...................................... | 522/110 |
| 4,772,506 | 9/1988 | Siol et al. ............................... | 428/212 |
| 4,877,675 | 10/1989 | Falicoff et al. ......................... | 428/204 |
| 4,887,890 | 12/1989 | Scherber et al. ....................... | 350/357 |
| 4,900,135 | 2/1990 | Yuasa et al. ............................ | 350/354 |
| 5,147,923 | 9/1992 | Mueller ................................... | 524/555 |

FOREIGN PATENT DOCUMENTS 42 06 317 A1   9/1993   Germany .

*Primary Examiner*—Susan W. Berman
*Attorney, Agent, or Firm*—Oblon, Spivak, McClelland, Maier & Neustadt, P.C.

[57] ABSTRACT

Polymer systems having reversibly temperature-dependent radiation transmission which are crosslinked with radiation induction, a process for their production, and their use for reversibly temperature-dependent control of the radiation transmission of glazing systems and solar-energy devices.

6 Claims, No Drawings

CROSSLINKED POLYMER SYSTEMS HAVING REVERSIBLE TEMPERATURE-DEPENDENT RADIATION TRANSMISSION

The present application is a continuing application of application Ser. No. 08/702,559, filled Oct. 15, 1996, now abandoned incorporated herein by reference.

The present invention relates to polymer systems having reversibly temperature-dependent radiation transmission which have been crosslinked with radiation induction.

The present invention furthermore relates to a process for the preparation of these polymer systems, and to their use for reversibly temperature-dependent control of the radiation transmission of glazing systems and solar-energy devices.

The irradiation of closed spaces or industrial equipment, for example solar collectors, with light causes them to heat up, which, depending on the energy content and intensity of the light, can take place to varying extents and in some cases can result in damage. For example, the energy content of sunlight, which varies depending on the time of day and season, causes undesired temperature values in buildings, greenhouses, automobiles and housings. This problem has hitherto only been remedied by expensive shading systems, for example covers and blinds.

A glazing system with temperature-controlled light transmission based on polymer mixtures has been described in DE 34 36 477 C2. The polymer mixture described therein is transparent below a certain temperature, but separates out above this temperature and is then cloudy. This is referred to below as thermotropic behavior.

A disadvantage is, however, that the separated-out, cloudy polymers cannot be converted reversibly into their original mixed, transparent state an infinite number of times. The requirement for a temperature-controlled shading system—shading at high temperature, light transmission again at low temperature, with frequent alternation—is consequently no longer satisfied.

DE 42 06 317 A1 describes a chemically crosslinked polymer mixture which, even on extended heating, can no longer separate out beyond a certain extent and can thus be converted reversibly back into the cooled, transparent state.

These polymer mixtures are, for example, coated as a solution onto the glass areas to be protected, with evaporation of the solvent.

However, a disadvantage in DE 42 06 317 A1 is that the chemical crosslinking, which is usually carried out just before application, sets in immediately after the polymers are mixed with the crosslinking agent in solution and continues during coating of the glass plate. This results in a rough, uneven surface of the thermotropic polymer layer. The uneven surface is unsuitable for transparent glazing through which it is desired to see at temperatures below the clouding temperature.

In addition, reactive functional groups in the polymer chains to be crosslinked are necessary for chemical crosslinking, which limits the choice of suitable polymers for the preparation of thermotropic polymer mixtures.

It is an object of the present invention to overcome the problems outlined.

We have found that this object is achieved by polymer systems with reversibly temperature-dependent radiation transmission which are crosslinked with radiation induction, by a process for the preparation of the novel polymer systems, and by their use for reversibly temperature-dependent control of the radiation transmission of glazing systems and solar-energy devices.

The mechanism of temperature-controlled, reversible clouding of polymers consists, in general terms, in the structure of the polymer system changing at a certain temperature in such a way that the radiation transmission changes.

This phenomenon usually occurs when polymer mixture components of different refractive index separate out with temperature induction. The temperature at which this process takes place is known as the lower critical separation temperature. Both this and aspects of thermotropic polymer mixtures have already been discussed in general terms in DE 34 36 477 C2.

Polymer systems with temperature-induced radiation transmission advantageously comprise at least two polymers P1 and P2 whose chemical composition is unimportant per se if the following boundary conditions are observed. In order to obtain a compatible and thus also transparent polymer mixture at low temperatures, below the critical separation temperature, it is generally necessary for an interaction to take place between the polymers P1 and P2. The interaction between the two polymers of the polymer systems must be neither too strong nor too weak. If the interaction is strong, a very high separation temperature of the polymer mixture, which can be above 100° C., is observed. If the interaction between the two polymers is too weak, the polymer mixture separates out even at room temperature under certain circumstances and is thus cloudy. The switching temperature—the temperature at which the radiation transmission of the polymer system changes—is thus below about 20° C. In some cases, absolutely no compatibility at all is observed on cooling, and the polymer mixture remains cloudy.

In order to achieve a short response time—the time taken for the radiation transmission of the polymer systems to change with temperature induction—use is advantageously made of polymers P1 and P2 whose compatible mixture has a glass transition temperature below the switching temperature of the polymer systems. High molecular mobility of at least one polymer component of the polymer mixture is important here. A measure of the molecular mobility is the glass transition temperature of a polymer. High mobility can be supported by a low molecular weight of a polymer component. It is sufficient in the polymer mixture for just one polymer to have a low glass transition temperature and thus high molecular mobility. For example, if the polymer P2 has a low glass transition temperature, the second polymer P1 can have a high glass transition temperature above the switching temperature so long as the glass transition temperature of the compatible polymer mixture remains below the clouding temperature. This second polymer of low mobility can therefore also be crosslinked without increasing the response time of the polymer mixture greatly. Further details in this respect are given in DE 42 06 317 A1.

The interaction between the two polymers can take place via various mechanisms which are well known in chemistry, for example salt formation, hydrogen bonding, complex formation, pi-electron interaction (in aromatic structures) or dipolar interaction.

Suitable polymers P1 and P2 can be selected from a number of known polymers, provided that the mixture of P1 and P2 have a difference in refractive index in the range from 00.1 to 1, for example homopolymers and copolymers, whose mixtures with one another have clouding points in the suitable region. Examples of suitable polymers P1 and P2 are polystyrene, polyvinyl methyl ether, polymethyl (meth) acrylate, styreneacrylonitrile copolymers, poly($\epsilon$-caprolactone), chlorinated rubber, ethylene-vinyl acetate copolymers, PVC, polycarbonate, polyvinylidene fluoride, polyethyl acrylate, poly-n-butyl acrylate, ethylhexyl acrylate-acrylic acid copolymers, tetradecyl methacrylate-styrene-3-dimethylamino-2,2-dimethylpropyl 1-methacrylate copolymers, styrene-hydroxyethyl methacrylate copolymers and polypropylene oxide.

Changing the relative content of the individual comonomers (interacting groups) in a copolymer is a very simple way of adjusting the critical clouding temperature to a desired value.

The relative content of the comonomers is not important. It is usually in the range from 0.1 to 50 mol %, preferably from 0.5 to 25 mol %.

The molecular weight $M_n$ (number average) of the polymers P1 and P2 is not important per se, but is generally in the range from 500 to 1,000,000, preferably from 1000 to 500,000.

The mixing ratio of the polymers P1 and P2 depends on the desired clouding temperature and to this extent can be freely selected. In general, the P1:P2 mixing ratio is in the range from 5:95 to 95:5, preferably from 20:80 to 80:20% by weight.

The polymers P1 and P2 can be prepared by the preparation processes known for this purpose, for example bulk polymerization, solution polymerization, suspension polymerization, dispersion polymerization and emulsion polymerization. If the relative reactivities of the comonomers differ greatly in the preparation of copolymers, a non-homogeneous distribution of the comonomers in the polymer chain can arise in some processes for the preparation of these polymers, which can result in problems with compatibility of the polymer mixtures. This disadvantage can be overcome if, for example, the polymerization reaction is terminated at a low monomer conversion, for example at a monomer conversion of from 10 to 20% by weight.

The novel polymer systems may additionally contain photoinitiators. These are chemical compounds which, on exposure to radiation, for example light, form free radicals, which can themselves react with the polymers P1 and P2, resulting in crosslinking and/or grafting of the polymer chains with one another. Compounds of this type are known to the person skilled in the art and are commercially available, for example benzophenone, benzoin, acetophenone, benzil dimethyl ketal, dibenzoyl disulfide, o-acyl-α-oximinoketones, S-phenylthiobenzoates, acylphosphine oxides, dibenzoylmethanes, phenylazo-4-diphenyl sulfone, 4-mor-pholino-α-dialkylaminoacetophenones, camphorquinone, fluorenones, α-ketocoumarines, anthraquinones and terephthalophenones. They are employed in an amount of from 0.1 to 15% by weight, preferably from 0.5 to 10% by weight, based on the solids content of the polymer system.

However, the photoinitiators in the novel polymer system can also, as comonomers, be part of polymer chains, as described, for example, in DE 38 44 445 A1. For the purposes of the present invention, photoinitiator comonomers are, for example, allylbenzoyl benzoate, 2-alkoxy-2-phenyl-2-benzoylethyl (meth)acrylates, (meth) acroyloxyethylcarbonatoacetophenone and (meth) acroyloxybutylcarbonatoacetophenone. For the purposes of the present invention, preference is given to (meth) acroyloxybutylcarbonatobenzophenone, (meth) acroyloxyethylcarbonatobenzophenone, (meth) acroyloxypropylcarbonatobenzophenone and in particular (meth)acroyloxybutylcarbonatobenzophenone.

The photoinitiator comonomers are in these cases copolymerized in the respective copolymer to the extent of from 0.01 to 15 mol %, preferably from 0.1 to 12 mol %, in particular from 0.5 to 10 mol %.

Accordingly, preference is given for the purposes of the present invention to polymer systems comprising a homopolymer or copolymer P2 having a low glass transition temperature and a molecular weight $M_n$ of from 500 to 50,000, for example polyethylene oxide, polytetrahydrofuran, polyvinyl methyl ether and in particular polypropylene oxide, and if desired, a copolymerizable photoinitiator, for example (meth) acroyloxybutylcarbonatobenzophenone. Preferred polymers P1 are molecularly uniform copolymers of styrene and (meth)acrylate monomers, in particular copolymers of styrene and one or more monomers which are able to form hydrogen bonds with the polymer P2, for example hydroxyethyl (meth)acrylate, dimethylaminoethyl (meth)acrylate, (meth)acrylic acid, and p-hydroxystyrene, and, if desired, a copolymerizable photoinitiator, for example (meth) acroyloxybutylcarbonatobenzophenone. Depending on the polymer P2, the content of comonomers which are capable of forming hydrogen bonds can be from 0.1 to 30 mol % in order to allow establishment of a clouding temperature of the polymer mixtures of from 20 to 120° C. The precise comonomer content cannot be given in general terms owing to the multiplicity of possible combinations of the polymers P1 and P2.

In addition to the components mentioned above, the novel polymer system can also contain conventional additives, for example dyes, pigments, anticorrosion agents and plasticizers in the customary amounts for the respective purpose.

In order to improve the polymer stability in solar-energy devices, conventional stabilizers against photochemical, oxidative, thermal or other degradation can be added, either before or after the radiation-induced crosslinking.

The novel polymer systems can be prepared as follows: the components according to the invention are dissolved in a suitable solvent, for example toluene or xylene, and the solution is applied to a support, for example a glass plate, a plastic plate or a plastic film. During or after evaporation of the solvent, the treated area is irradiated. The radiation wavelength is in the range from 100 to 2000 nm, preferably from 100 to 1000 nm, in particular from 100 to 800 nm. Apart from UV radiation or visible light, it is also possible to use electron teams having an energy in the range from 100 to 500 keV or gamma rays for the crosslinking.

The production of a film of the novel polymer system can also be carried out without solvents, for example by melting the mixed components according to the invention. This can be effected, for example, in an extruder, the molten mixture being extruded through a slot die in the form of a film and then irradiated. The film can furthermore be produced directly on the body to be coated; this can be accomplished by heating and irradiating the novel polymer system.

The thickness of the dry film is in the range from about 50 μm to 2 mm. The novel polymer system need not necessarily be applied to a support, but instead can be used as such, for example in the form of a film or plate.

The critical separation temperature of the novel polymer systems is generally in the range from 20 to 120°, preferably in the range from 30 to 100° C.

Apart from in glazing systems, for example building, conservatory or greenhouse windows, the novel polymer system can also be used in the area of solar energy. This is taken to mean where, for example, solar collectors are protected against overheating. Transparent heat insulation, which helps to utilize solar energy in a house during a relatively cold period, can also prevent the insulated rooms overheating and the heat insulation itself from being destroyed during strong sunlight in summer by the use of the novel polymer systems.

The novel polymer systems are distinguished by variable processing properties, a short response time and a low creep tendency.

EXAMPLES

Example 1

15 parts of a molecularly uniform copolymer comprising 93.5 mol % of styrene, 6 mol % of hydroxyethyl methacrylate and 0.5 mol % of 4-acroyloxybutylcarbonatobenzophenone as photoinitiator (P1) and 35 parts of poly(propylene oxide) (P2) ($M_n$=4000) are dissolved in 50 parts of toluene at room temperature to give a clear solution. The mixture is coated onto a specimen slide using a 200 μm knife coater, and the solvent is evaporated. The resultant polymer film is exposed for 30 minutes to UV light (spectral region 290 to 450 nm) from a flat UV exposure unit (irradiation intensity: 30 mW/cm$^2$ in the UV/A region). The polymer layer is then heated and the clouding temperature measured. It is 68° C.

Examples 2 to 4

The procedure is similar to that in Example 1, but different mixing ratios of the polymers P1 and P2 are used (Table 1).

TABLE 1

| Example | Parts of P1 | Parts of P2 | Clouding temperature [° C.] |
|---|---|---|---|
| 2 | 20 | 30 | 80 |
| 3 | 25 | 25 | 100 |
| 4 | 30 | 20 | 130 |

Example 5

The procedure is similar to that in Example 1, but 20 parts of a uniform copolymer P1a, comprising 95.5 mol % of styrene, 4 mol % of hydroxyethyl methacrylate and 0.5 mol % of 4-acroyloxybutylcarbonatobenzophenone are mixed with 30 parts of poly(propylene oxide) (P2). The clouding temperature of this mixture is 40° C.

Example 6

The procedure is similar to that in Example 1, but 29 parts of a uniform copolymer P1b, comprising 95 mol % of styrene, 4 mol % of hydroxyethyl methacrylate and 1 mol % of 4-acroyloxybutylcarbonatobenzophenone, are mixed with 21 parts of poly(propylene oxide) (P2). The clouding temperature is 41° C. The polymer layer is stored at 120° C. for 150 minutes. After rapid cooling to room temperature, it has become transparent again after 8 minutes.

We claim:

1. A crosslinked polymer system, obtained by exposing a mixture of at least two different polymers to radiation selected from the group consisting of ultraviolet radiation, visible light and electron beam;

wherein said mixture of polymers is free of a chemical crosslinking agent that initiates crosslinking immediately after said at least two polymers are mixed with a crosslinking agent;

wherein said mixture of polymers is free of a solvent;

wherein said crosslinked polymer system exhibits temperature-dependent reversible clouding;

wherein said mixture of polymers is compatible at a glass transition temperature below the temperature of reversible clouding; and wherein the temperature of reversible clouding is from 20 to 120° C.

2. A crosslinked polymer system as claimed in claim 1, wherein in the mixture of polymers contains photoinitiators.

3. A crosslinked polymer system as claimed in claim 1, where a glass transition temperature of at least one polymer in the mixture is below a clouding temperature of the polymer mixture.

4. A crosslinked polymer system as claimed in claim 1, where at least two polymers in the mixture have a difference in refractive index in the range from 0.01 to 1.

5. The polymer composition as claimed in claim 1, where the radiation used for the crosslinking has a wavelength in the range from 100 to 2000 nm, or the electron radiation has an energy of from 100 to 500 keV.

6. A method of forming a glazed article or solar-energy device comprising:

applying a mixture of at least two polymers to a support;

irradiating said polymer mixture;

wherein said polymer mixture is free of a solvent;

wherein said crosslinked polymer system exhibits temperature-dependent reversible clouding;

wherein said polymer mixture is compatible at a glass transition temperature below the temperature of reversible clouding; and wherein the temperature of reversible clouding is from 20 to 120° C.

* * * * *